No. 712,095. Patented Oct. 28, 1902.
R. REED.
DRINK SHAKER.
(Application filed Feb. 10, 1902.)
(No Model.)
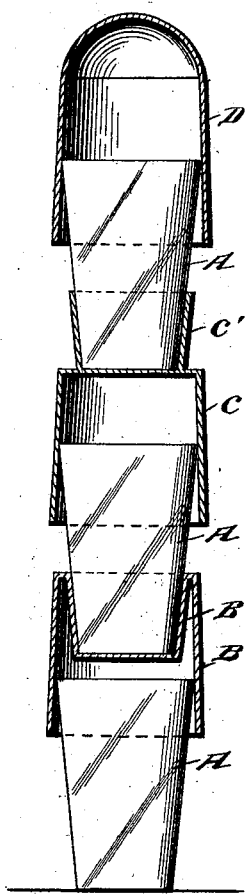
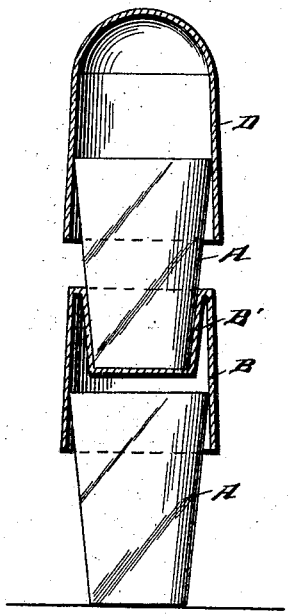
Witnesses
Inventor
Richard Reed
By his Attorneys

UNITED STATES PATENT OFFICE.

RICHARD REED, OF OSHKOSH, WISCONSIN.

DRINK-SHAKER.

SPECIFICATION forming part of Letters Patent No. 712,095, dated October 28, 1902.

Application filed February 10, 1902. Serial No. 93,474. (No model.)

*To all whom it may concern:*

Be it known that I, RICHARD REED, a citizen of the United States, residing at Oshkosh, in the county of Winnebago and State of Wisconsin, have invented new and useful Improvements in Drink-Shakers, of which the following is a specification.

My invention relates to drink shakers or mixers; and the object of my invention is to provide a means for shaking a plurality of the same kind of drink or different drinks simultaneously with great convenience and without any liability of the contents of one receptacle getting into the other or being wasted.

The invention consists of a plurality of glasses or liquid-holding receptacles and devices for containing the liquid-holding receptacles and forming a cover therefor.

The invention also consists of a device for use in shaking drinks consisting of a main body portion forming a cover for a liquid-containing receptacle and holding another liquid-containing receptacle.

Figure 1 in the accompanying drawings shows a vertical section of my invention as applied to three glasses, and Fig. 2 shows the adaptation of my invention to two glasses.

A A A represent the glasses or liquid-containing receptacles; B, the lower shaker; C, the intermediate shaker, and D the top cap or shaker. It will be observed that the lower shaker B is provided with a recessed top B' for admission of the bottom of the glass A. This construction serves to make the device stiffer and more substantial. The intermediate shaker C is constructed with an extension top or cup C' to receive the bottom of the mixing-glass A.

In using my invention the first glass or receptacle is placed upon any support and covered with the shaker B. The next glass is then placed in the recess B' and covered by the shaker C, and the next glass placed in the cup C' and covered by the cap D. The three glasses are then ready to be shaken by one operation.

Where only two glasses are to be shaken, the shaker B and cap D only are used, as shown in Fig. 2, or the intermediate shaker C and the cap D may be used.

Having thus described my invention, what I claim as my invention, and desire to secure by Letters Patent, is—

1. A drink-shaker comprising a plurality of liquid-holding receptacles arranged one above the other, the lower receptacle being provided with a device fitted on its upper edge for receiving and holding the upper receptacle, said device also serving as a cover for the lower receptacle, and a top cover fitted over the upper receptacle, substantially as described.

2. A device for use in shaking drinks comprising a body portion having side flanges adapted to inclose the upper edge of a liquid-containing receptacle, the said device being also provided with means for receiving and holding another liquid-containing receptacle, substantially as described.

3. A device for use in shaking drinks, comprising a body portion having side flanges, and an inwardly and downwardly extending depressed central portion, the device being designed and adapted to be placed over the upper edge of a liquid-holding receptacle to form a cover therefor and also to receive and hold another liquid-holding receptacle, substantially as described.

In testimony whereof I have hereunto set my hand in the presence of two subscribing witnesses.

RICHARD REED.

Witnesses:
   ANNA R. WATERHOUSE,
   W. J. O'ROURKE.